United States Patent [19]

Dattilo

[11] 3,770,177

[45] Nov. 6, 1973

[54] CAPSTAN HOUSING ASSEMBLY FOR A CARTRIDGE TAPE PLAYER

[75] Inventor: Donald J. Dattilo, Mt. Prospect, Ill.

[73] Assignee: Motorola, Inc., Franklin Park, Ill.

[22] Filed: Dec. 11, 1972

[21] Appl. No.: 313,889

[52] U.S. Cl. .................................. 226/194, 274/4 D
[51] Int. Cl. ............................................ B65h 17/20
[58] Field of Search ............................ 226/190, 194; 274/4 R, 4 A–4 E

[56] References Cited

UNITED STATES PATENTS

| | | | |
|---|---|---|---|
| 3,385,497 | 5/1968 | Taraborrelli | 226/190 X |
| 3,252,668 | 5/1966 | Miller et al. | 226/194 X |

FOREIGN PATENTS OR APPLICATIONS

| | | | |
|---|---|---|---|
| 847,357 | 8/1952 | Germany | 226/194 |

*Primary Examiner*—Allen N. Knowles
*Assistant Examiner*—Gene A. Church
*Attorney*—Vincent J. Rauner et al.

[57] ABSTRACT

A sheet metal capstan housing for mounting a capstan drive shaft on the tape deck of a cartridge tape player includes a substantially Z-shaped support bracket having a first leg fastened to the base wall of the tape deck in parallel relation therewith. The opposite leg of the bracket includes a first toroidal bearing mounted therein for receipt of a capstan drive shaft extending substantially perpendicular to the base wall of the tape deck. A second toroidal bearing aligned with the first bearing is provided in the base wall to receive the capstan shaft also, and a capstan stop member is attached to the base wall on the surface thereof opposite the surface on which the support bracket is mounted. The stop member engages the end of the capstan shaft inserted through the bearings to position the shaft correctly in the support bracket.

6 Claims, 3 Drawing Figures

CAPSTAN HOUSING ASSEMBLY FOR A CARTRIDGE TAPE PLAYER

BACKGROUND

This invention relates generally to cartridge type tape players and more particularly to the construction and fabrication of the tape deck portion thereof.

Conventionally, in the fabrication of a cartridge tape player device, the tape deck therefor is formed as a unit from cast metal. In fabricating the tape deck in this manner, the capstan housing is integrally formed therewith. While the latter provides adequate support for a capstan drive shaft received therein, the unitized cast tape deck becomes expensive partially because of the need for tapping and reaming holes in the cast metal capstan housing subsequent to fabrication to accommodate bearings in which the capstan rides thereby to insure free turning of the capstan shaft during operation of the player.

SUMMARY

Accordingly, it is a primary object of the present invention to provide a new and improved tape deck construction for a cartridge type tape player which overcomes the drawbacks of presently produced cast metal tape decks.

It is another object of the invention to provide a tape deck for a cartridge tape player including a new and improved capstan housing which provides adequate support for a capstan drive shaft mounted therein and which is relatively inexpensive to fabricate and assemble.

Briefly, a preferred embodiment of the tape deck for a cartridge tape player according to the invention includes a stamped sheet metal member having a base wall with a pair of upstanding side walls bent at substantially right angles therewith to form a tape cartridge housing or cavity having a front cartridge receiving opening.

A capstan drive motor is mounted on the base wall near the rear portion thereof and a magnetic tape head and other tape handling instrumentalities are also mounted on the base wall in spaced relation from the motor near the front opening of the cartridge receiving cavity.

Directly in front of the motor there is provided a capstan housing including a generally Z-shaped support bracket member having a first leg of the Z riveted to the base wall; the last-mentioned leg extending away from the front opening of the housing. The second leg of the Z-shaped support member extends toward the front opening and is generally horizontal and in spaced relation from the base wall. The last-mentioned leg includes an aperture drilled therethrough to accommodate a bronze toroidal bearing member. A drilled aperture is also provided in the base wall of the tape deck in alignment with the aperture in the leg of the capstan housing member. A similar bearing member likewise is received in the aperture in the base wall.

On the outside surface of the base wall, there is provided a capstan stop member. This member is also generally Z-shaped having a first leg riveted to the base wall and with the opposite leg extending parallel to the outside surface of the base wall in alignment with the bearing aperture formed therein and in spaced relation with respect thereto.

One end of a capstan drive shaft is inserted through the bearing member in the second leg of the Z-shaped capstan housing and into the second bearing member located in the base wall, until the one end engages the second leg of the capstan stop member. On the opposite end of the capstan drive shaft there is provided a conventional flywheel to which a drive belt is coupled. The belt likewise is coupled to the drive shaft of the motor for driving the flywheel and capstan rotatably in response to the operation of the motor.

DETAILED DESCRIPTION

Figure 1:
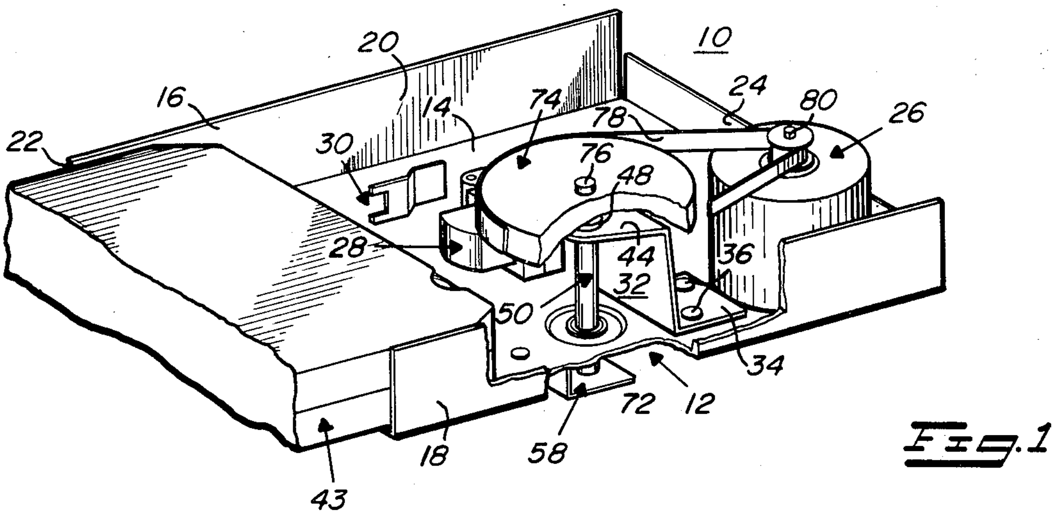
FIG. 1 is a perspective view of a tape deck for a cartridge tape player including a capstan housing assembly according to the invention.

Referring now to the drawing in greater detail wherein like numerals have been used throughout the various views to designate similar parts, there is illustrated in FIG. 1 a tape deck 10 of a cartridge type tape player including a capstan housing assembly 12 according to the invention.

The tape deck is formed from stamped sheet metal and includes a base wall 14 and side walls 16, 18 respectively, formed integrally with the base wall and extending upwardly therefrom at substantially right angles therewith to form a tape cartridge receiving housing or cavity 20. A front opening 22 is provided in the tape cavity through which a tape cartridge such as 43 is received therein. A rear wall 24 is joined to the base wall 14 and extends upwardly therefrom at right angles thereto.

Mounted on the base wall 14 near the rear wall 24 is a capstan drive motor 26 of the conventional type. Also mounted on base wall 14 near the front opening 22 of the tape deck cartridge receiving cavity, is a magnetic tape head assembly 28 for playing back information recorded on a tape within a cartridge received in the cavity and a tape guide 30.

Directly in front of the motor 26 there is provided the capstan housing assembly 12 according to the invention. The housing assembly, as shown in greater detail in FIGS. 2 and 3, includes a generally Z-shaped capstan support bracket 32 formed of a single piece of stamped metal and bent to shape.

A first leg portion 34 of the support bracket extends parallel to the base wall 14 of the tape deck and preferably away from front opening 22 (FIG. 1). The leg portion is attached to base wall 14 by means of rivets, such as 36 or the like fasteners, which pass through preformed apertures 38 in leg 34 and aligned apertures 40 in base wall 14 to mount the support bracket 32 on the base wall. A main body portion 42 of the support bracket extends from leg portion 34, generally vertically upwardly from base wall 14 but angled slightly away from leg portion 34.

Figures 2, 3:
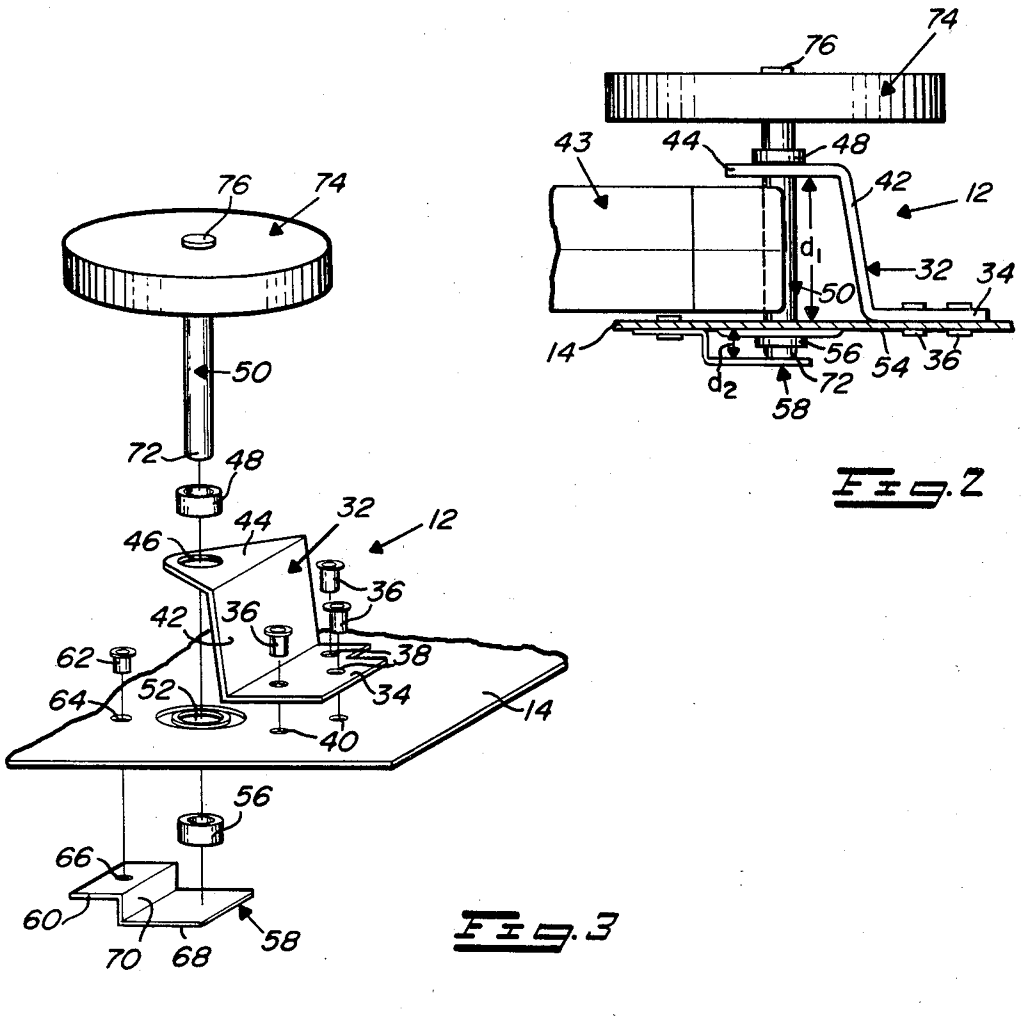
FIG. 2 is a side view of the capstan housing assembly of FIG. 1.
FIG. 3 is an exploded, perspective view of the capstan housing assembly of FIGS. 1 and 2.

A second leg portion 44 of the Z-shaped bracket 32 extends parallel to the first leg portion and to base wall 14, away from main body portion 42 in a direction opposite from leg portion 34, and is spaced from base wall 14 by a predetermined distance $d1$, sufficient to accommodate the tape cartridge 43 as shown in FIG. 2, inserted into the player. The leg portion 44 includes a preformed aperture 46 extending therethrough into which a toroidal shaped bronze bearing member 48 is received. The bearing member is fitted frictionally into the aperture 46 in leg portion 44 of the support bracket. The inner diameter of the bearing member is dimensioned to accommodate a standard capstan drive shaft 50.

Directly beneath leg portion 44 in base wall 14 and in alignment with aperture 46, there is provided another aperture 52 (FIG. 3). The aperture 52 is likewise dimensioned to receive therein, from the lower surface 54 of base wall 14, a bronze bearing member 56 similar to bearing member 48 described heretofore.

Beneath the tape deck housing, attached to base wall 14 at surface 54 thereof, is a capstan stop member 58, also formed of a single piece of stamped sheet metal and bent substantially in a Z-shape. A first leg 60 of the stop member 58 extends parallel to the base wall 14 and is attached thereto by means of a rivet 62 passing through apertures 64, 66 provided in base wall 14 and leg 60, respectively. A second leg 68 joined to the main body 70 of the stop member, interposed between legs 60, 68 extends parallel to base wall 14 and is spaced therefrom a predetermined distance $d2$ (FIG. 2).

The end 72 of capstan drive shaft 50 is received in bearing member 48. The capstan drive shaft passes through both bearing members 48 and 56 until end 72 thereof engages leg 68 of the stop member 58 upon which the capstan shaft rests and rotates axially during operation of the tape player. The stop member limits the movement of the capstan drive shaft in an axial direction upon insertion of the latter through the bearing members 48, 56, to position the capstan shaft properly for rotation in the support bracket 32. While no bearing portion has been shown at the end 72 of the capstan shaft 50 for engagement with stop member 58, one may be provided to insure that the capstan shaft turns freely. The last-mentioned bearing member, it should be understood, is not a necessity and therefore is not shown in the drawing of the instant application. A conventional flywheel 74 is mounted on the opposite end 76 of the capstan drive shaft and is coupled to the drive shaft 80 of motor 26 by a drive belt 78. Thus, upon energization of motor 26, flywheel 74 is rotated to drive the capstan shaft 50 therewith.

Thus, as can be seen from the above description, the stamped sheet metal capstan housing assembly according to the invention provides an inexpensive, easily fabricated support means for mounting a capstan drive shaft in a cartridge tape player. Furthermore, assembly of the capstan housing is relatively simple. In addition, the capstan housing assembly according to the invention provides support to a capstan drive shaft and flywheel in the environment of a cartridge tape player equally as good as a cast metal housing, while being significantly less expensive. In fact, it has been estimated that the cost savings of a capstan housing assembly like that of the instant invention, over an equivalent conventional die cast capstan housing assembly is over 85%.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. In a tape deck for a cartridge tape player including a cartridge receiving housing having a base wall and a pair of side walls extending therefrom in spaced, parallel relation with respect to each other, and a front opening through which a cartridge is received in said housing, a capstan drive shaft housing assembly for mounting a capstan drive shaft rotatably on said tape deck, including in combination: a capstan support bracket of sheet metal construction having first and second spaced legs extending substantially parallel to said base wall and a main body portion joined to and extending between said legs, a first one of said legs being attachable to said base wall for mounting said bracket on said tape deck, the other of said legs extending from said main body portion in a direction opposite said first leg and having an aperture therein, a first bearing member mounted in said aperture for receiving said capstan shaft, said bearing member being positioned in spaced alignment with a similar bearing member provided in said base wall upon attaching said bracket to said base wall, said capstan shaft being receivable in said bearing members and supported therein by said support bracket for rotational movement.

2. A capstan drive shaft housing assembly as claimed in claim 1 further including a stop member for said capstan drive shaft, said stop member being attachable to the surface of said base wall opposite said cartridge receiving opening, in alignment with said apertures in which said bearing members are received, for engagement with a first end of said capstan shaft received in and extending through said bearing members.

3. A capstan drive shaft housing assembly as claimed in claim 2 wherein said stop member is of sheet metal construction and includes a pair of spaced parallel legs and a main body portion interposed therebetween and joined to said legs, a first one of said legs being attachable to the surface of said base wall opposite said cartridge receiving housing with said second leg extending away from said first leg and in alignment with said bearing member receiving apertures, and being spaced predeterminedly from said base wall for positioning said capstan shaft axially in said support bracket.

4. A capstan drive shaft housing assembly as claimed in claim 3 wherein said capstan support bracket is formed of a single piece of sheet metal material, bent to a generally Z-shape, and wherein upon mounting said bracket on said base wall, said first leg extends away from said front cartridge receiving opening and said second leg extends toward said front opening, said second leg being predeterminedly spaced from said base wall to accommodate a tape cartridge inserted into said front opening between said second leg and base wall.

5. A tape deck for a cartridge tape player including in combination: a sheet metal cartridge receiving housing having a base wall and a pair of side walls extending from said base wall in a first direction substantially at right angles thereto, said housing having a front cartridge receiving opening and a housing assembly for mounting a capstan drive shaft on said tape deck, said capstan housing assembly including, a support bracket constructed of a single piece of sheet metal and bent to form first and second spaced, parallel, legs extending in opposite directions and a main support member extending therebetween, the first leg of said support bracket member being fastened in parallel alignment to said base wall so that said second leg extends toward the front cartridge receiving opening of said housing and is spaced a predetermined distance from said base wall, a first toroidal bearing member mounted in an aperture provided in said second leg for receiving a capstan drive shaft to position the latter substantially perpendicular to said base wall, a second toroidal bearing member mounted in an aperture in said base wall positioned in alignment with said first aperture, also for receiving said capstan drive shaft and a capstan stop member attached to said base wall on the surface thereof opposite the surface on which said support bracket is mounted, a portion of said stop member being in alignment with said first and second bearing members and spaced from said opposite surface of said base wall a predetermined distance for engagement with a first end of said capstan shaft extending through said base wall in said second bearing member to position said capstan shaft for axial rotation in said support bracket.

6. A tape deck as claimed in claim 5 wherein said capstan stop member is of one piece sheet metal construction, bent to form a pair of spaced parallel legs and a main body portion interposed therebetween, a first one of said legs being attached to said base wall in parallel alignment therewith, at the surface thereof opposite said cartridge receiving housing with said second leg extending away from said first leg and in alignment with said apertures receiving said bearing members, and being spaced predeterminedly from said base wall for engagement with an end of said capstan shaft to position said shaft axially in said support bracket.

* * * * *